United States Patent [19]

Haga

[11] Patent Number: 5,629,512

[45] Date of Patent: May 13, 1997

[54] INVISIBLE INFORMATION RECORDING MEDIUM AND APPARATUS FOR READING INFORMATION FROM THE SAME

[75] Inventor: Yasunobu Haga, Tokyo, Japan

[73] Assignee: Olympus Optical Co., Ltd., Tokyo, Japan

[21] Appl. No.: 446,044

[22] Filed: May 19, 1995

Related U.S. Application Data

[62] Division of Ser. No. 291,624, Aug. 17, 1994, Pat. No. 5,532,104.

[30] Foreign Application Priority Data

| Aug. 19, 1993 | [JP] | Japan | 6-205360 |
| Sep. 6, 1993 | [JP] | Japan | 5-221243 |
| Dec. 27, 1993 | [JP] | Japan | 50331801 |

[51] Int. Cl.⁶ .............................. G06K 9/10; B42D 15/00
[52] U.S. Cl. .............................................. 235/468; 283/92
[58] Field of Search ........................... 235/468, 449, 235/491; 250/271, 556; 233/92, 85, 109, 91, 86

[56] References Cited

U.S. PATENT DOCUMENTS

| 3,614,430 | 10/1971 | Berler | 235/468 X |
| 3,887,271 | 6/1974 | Yamaguchi et al. | 850/458.1 |
| 4,579,754 | 4/1986 | Maurer et al. | 283/358 |
| 5,380,992 | 1/1995 | Damen et al. | 250/281 X |
| 5,414,262 | 5/1995 | Filo | 250/271 |
| 5,502,304 | 3/1996 | Berson et al. | 250/271 |

FOREIGN PATENT DOCUMENTS

| 3-75886 | 3/1991 | Japan | 235/468 |
| 3-182988 | 8/1991 | Japan | 235/468 |
| 5-12503 | 1/1993 | Japan | 235/468 |
| 5-149786 | 6/1993 | Japan | 235/468 |
| 8706197 | 10/1967 | WIPO | 233/92 |

*Primary Examiner*—Donald T. Hajec
*Assistant Examiner*—Thien Minh Le
*Attorney, Agent, or Firm*—Frishauf, Holtz, Goodman, Langer & Chick

[57] ABSTRACT

An invisible information recording medium includes an underlying layer, an invisible information recording layer provided above the underlying layer, being invisible under visible light, and fluorescing upon being applied with light having a particular wavelength excepting that of the visible light, thus becoming visible, and an optical modulation layer provided between the underlying layer and the recording layer. When the modulation layer includes a photochromic layer, an information reading apparatus for reading information from the medium includes a preliminary coloring unit for coloring the photochromic layer of the modulation layer in advance, and an information reading optical system for applying the light having the particular wavelength excepting that of the visible light to the recording layer to cause the recording layer to fluoresce after the photochromic layer is turned to the colored state by the coloring unit, thereby making the recording medium visible, and reading information from the recording layer which has become visible. When the optical modulation layer includes an optical polarizing film, an information reading apparatus for reading information from the medium includes an information reading optical system for reading information from the recording layer which has become visible, and an optical polarizing unit, interposed between the recording layer and the optical system and having an optical polarizing angle perpendicular to that of the polarizing film, for guiding light from the recording layer which has become visible to the optical system.

5 Claims, 7 Drawing Sheets

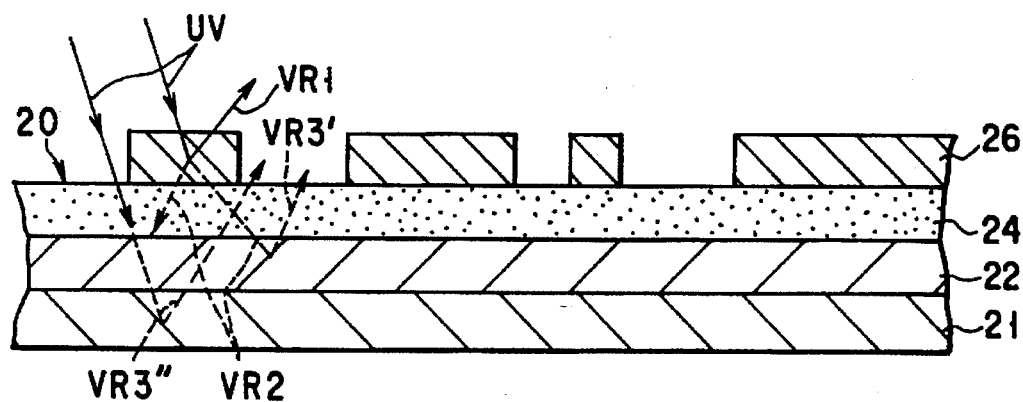
F I G. 1
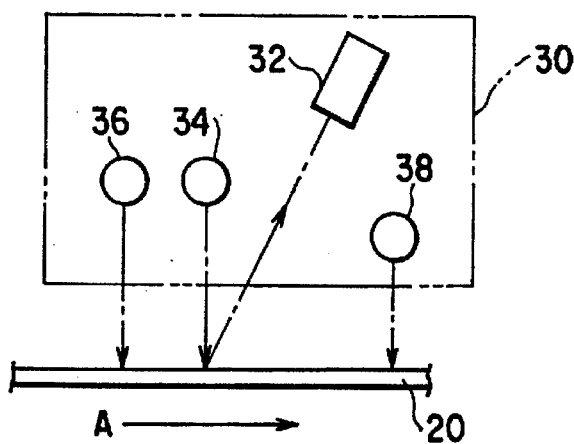
F I G. 2
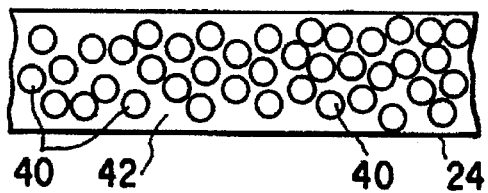
F I G. 3A
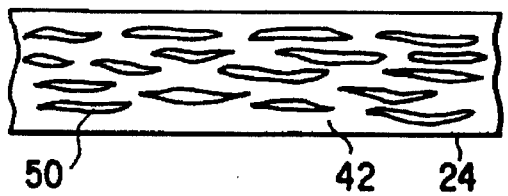
F I G. 3B

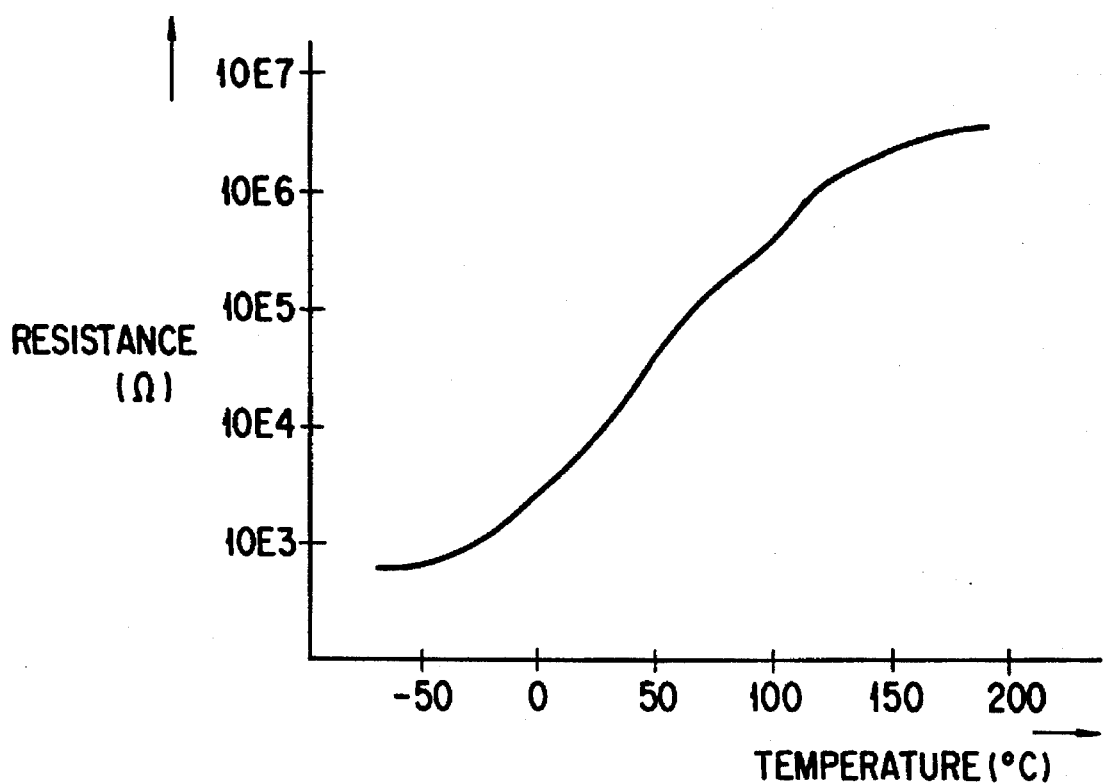
F I G. 14
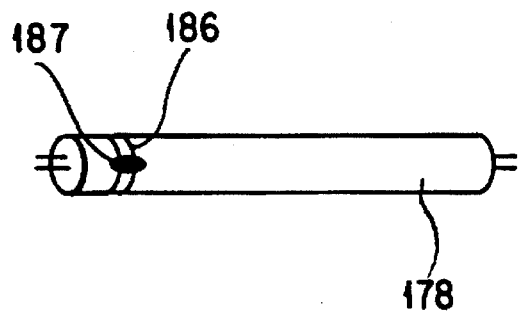
F I G. 15

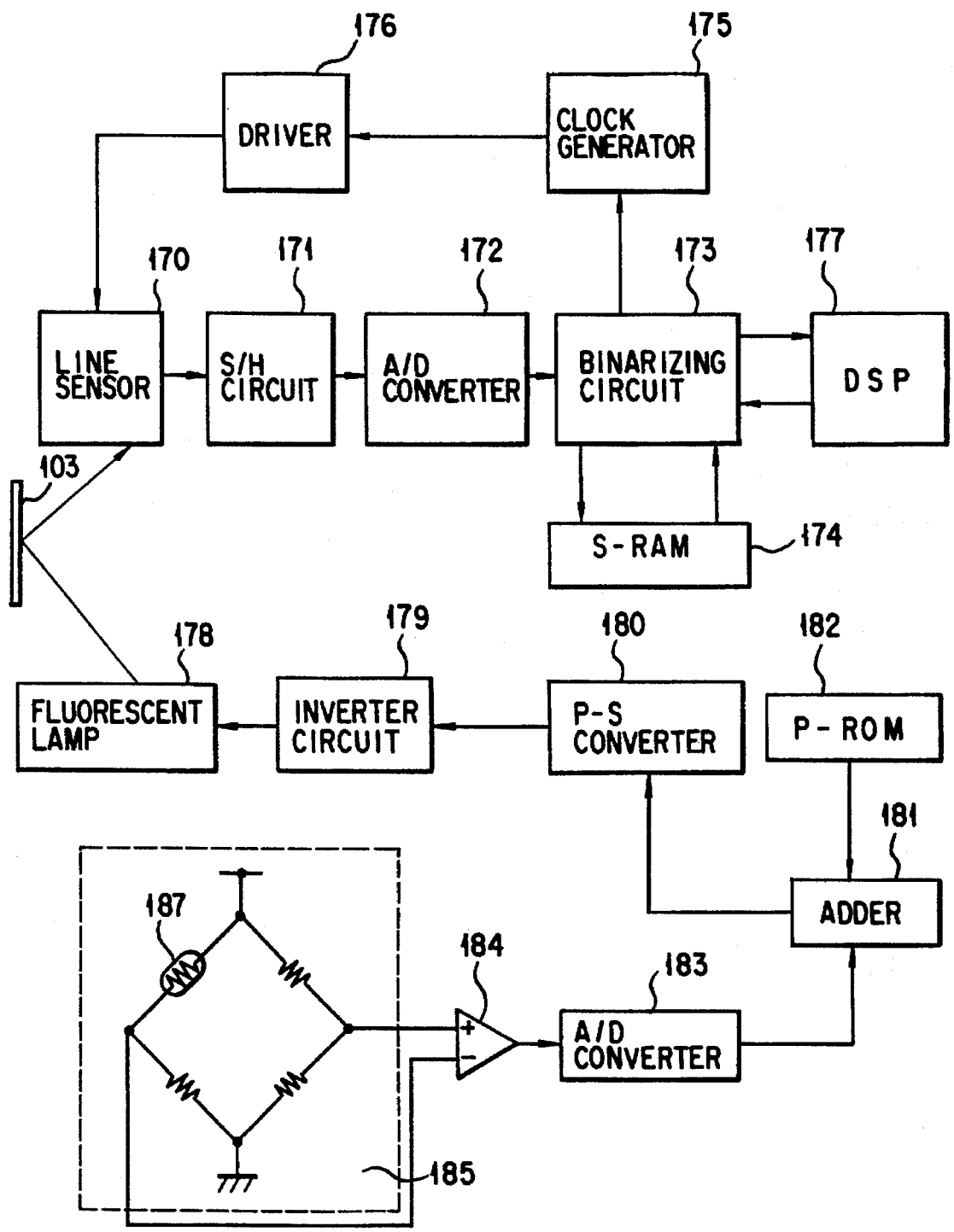
F I G. 16

INVISIBLE INFORMATION RECORDING MEDIUM AND APPARATUS FOR READING INFORMATION FROM THE SAME

This is a division of application Ser. No. 08/291,624 filed Aug. 17, 1994 now U.S. Pat. No. 5,532,104.

BACKGROUND OF THE INVENTION

1. Field of the Invention

The present invention relates to an invisible information recording medium having an invisible information recording layer above an underlying layer, the recording layer being invisible under visible light and fluorescing upon being applied with light having a particular wavelength excepting that of visible light, thus becoming visible, and an information reading apparatus for efficiently reading information from the invisible information recording medium.

2. Description of the Related Art

Such an invisible information recording medium is known as, e.g., an invisible bar code (to be referred to as a stealth bar code hereinafter).

Merchandise management using bar codes is becoming popular in recent years because quickness, correctness, and simplicity of information input by means of bar codes are widely recognized. As merchandise management using bar codes is used in many fields, the following demands have arisen. For example, in some fields, a specific space for printing only the bar code cannot be kept on an underlying layer and thus a bar code must be printed on an existing printed characters of the underlying layer, and a bar code should not be printed on a part of the existing printed characters from the viewpoint of good appearance. In order to satisfy these demands, a stealth bar code, which is invisible under visible light and fluoresce upon being applied with light having a particular wavelength excepting that of visible light, thus becoming visible, has been proposed.

For example, a stealth bar code can be formed by printing with an ink containing a fluorescent material which is invisible under visible light but is excited upon being applied with ultraviolet rays to emit visible light, thus becoming visible.

A stealth bar code becoming visible under ultra-violet rays has following drawbacks.

In a conventional information recording medium on which a stealth bar code is printed, as shown in a sectional view of FIG. 5, an underlying printed layer 12, on which a pattern, e.g., characters, figures, and pictures, is printed, exists on an underlying layer 10 made of, for example a paper, and a stealth bar code layer 14 is printed on the underlying printed layer 12.

The stealth bar code layer 14 is formed by printing with an ink containing a fluorescent material which is invisible under visible light but is excited upon being applied with ultraviolet rays to emit visible light, thus becoming visible. When the stealth bar code layer 14 is applied with ultraviolet rays UV, it fluoresces to emit visible light, and visible light VR1 directed upward from the stealth bar code layer 14 makes visible the stealth bar code constituted by the stealth bar code layer However, since the visible light generated by fluorescence of the stealth bar code layer 14 is directed to all the directions, visible light VR2 directed downward below the stealth bar code layer 14 is reflected by the underlying printed layer 12, and reflected light VR3' decreases the contrast among the bars and spaces of the stealth bar code which has become visible. Also, a pattern, e.g., characters, figures, and pictures, of the underlying printed layer 12, which is visible with the reflected light VR3', overlaps the stealth bar code which has become visible, and decreases the contrast among the bars and spaces of the stealth bar code.

As a result, bar code information cannot sometimes be read from the visible stealth bar code with a bar code reading apparatus.

A fluorescent material is often mixed in the paper of the underlying layer 10 to make it look white. In this case, when ultraviolet rays are applied onto the stealth bar code layer 14 to read bar code information from the stealth bar code, the ultraviolet rays reach the underlying layer 10 to make the fluorescent material in the underlying layer 10 fluoresce. As a result, visible light VR3" generated by fluorescence of the underlying layer 10 decreases the contrast among the bars and spaces of the visible stealth bar code, as described above. Then, bar code information cannot sometimes be read from the stealth bar code with the bar code reading apparatus.

Although not shown, when a stealth bar code layer is directly formed on an underlying layer in which no fluorescent material is mixed, a part of the visible light generated by the fluorescence of a stealth bar code layer 14, directs downward from the visible stealth bar code layer 14 and reaches the underlying layer 10 and is reflected by it. This reflection decreases the contrast among the bars and spaces of the stealth bar code which has become visible. Then, bar code information cannot be read from the visible stealth bar code with the bar code reading apparatus.

Structures for eliminating these conventional drawbacks are disclosed in Japanese Patent Application KOKAI Publication Nos. 3-182988 and 5-12503.

According to Jpn. Pat. Appln. KOKAI Publication No. 3-182988, in order to prevent an underlying pattern from being visible when visible light generated by fluorescence of a stealth bar code layer is applied to the underlying pattern, the underlying pattern is printed by using an ink having substantially the same light reflectance as that of the surface of an underlying layer when the visible light is applied to the under laying layer. However, when various colors of inks are used for printing the underlying pattern, it is difficult to prepare all the inks of different colors to have the reflectance described above. In addition, this proposal cannot be applied to a black ink.

According to Jpn. Pat. Appln. KOKAI Publication No. 5-12503, a layer which absorbs light having a wavelength to excite a fluorescent substance and transmits visible light is provided between a stealth bar code layer and an underlying printed layer. In this case, even when ultraviolet rays are applied onto the stealth bar code layer to read bar code information from the stealth bar code, light having the wavelength that excites the fluorescent substance does not reach the underlying printed layer, and the fluorescent substance contained in the underlying layer does not fluoresce. However, since the visible light generated by fluorescence of the stealth bar code layer reaches the underlying printed layer, the contrast of the bar code cannot be prevented from being decreased by reflected light generated when this visible light is reflected by the underlying printed layer, and by an underlying pattern which is visible with this reflected light.

A bar code reading apparatus for reading a stealth bar code applies ultraviolet rays of a single wavelength on an information recording medium on which a stealth bar code is printed by using fluorescent ink, and detects light the stealth bar code by a generated from photodetector, thereby reading data from the stealth bar code.

Further, in this kind of bar code reading apparatus, a fluorescent lamp emitting ultraviolet rays having a single wavelength is used to apply the ultraviolet rays to a bar code formed by using fluorescent ink when the bar code is read.

However, since a light emission characteristic of the fluorescent lamp cannot be stabilized until a predetermined time period have passed after a power thereof is turned on, the fluorescent lamp is continuously kept turned on. In addition, since the light emission characteristic is changed by temperature change, it is difficult to obtain a stable light emission characteristic.

When ultraviolet rays generated from the fluorescent light and having a single wavelength is applied to the stealth bar code to read bar code information from the stealth bar code, the fluorescent ink of the stealth bar code fluoresces to generate visible light. However, the visible light also applies on an underlying printed patter to make the contrast of the visible stealth bar code being decreased by a color of the underlying printed patter, and to make difficult a bar code reading by the bar code reading apparatus.

As a method for eliminating the drawbacks described above, Jpn. Pat. Appln. KOKAI Publication No. 5-149786 discloses a method for controlling a quantity of emitting light or a quantity of received light with use of an analogue-digital (A/D) converter and a digital-analogue (D/A) converter.

In addition, as a method for eliminating the influence of the color of the underlying printed pattern, Jpn. Pat. Appln. KOKAI Publication No. 3-75886 discloses a method for subtracting outputs of a sensor for detecting light reflected from the underlying printed pattern from outputs of a sensor for detecting light reflected from the stealth bar code.

A stealth bar code reading apparatus being designed such that the light emission character of the fluorescent lamp is always stabled has a large power consumption, and is therefore not suitable for a portable type. However, since the light emission character of the fluorescent lamp is not stable immediately after the power of the fluorescent lamp is turned on, a method of repeatedly turning on and off the fluorescent lamp can not be used.

Although it is therefore possible to use a method for controlling a light emitting element, the method for controlling the light emitting element by using an analogue-digital (A/D) converter and a digital-analogue (D/A) converter requires a large circuit, and therefore, a cost for manufacturing an apparatus to perform the method is increased.

Further, in the method for eliminating influences of the color of the underlying printed patter, error of the sensor for sensing light reflected from the stealth bar code and error of the sensor for sensing light reflected from the underlying printed pattern must be considered, and thus, these two sensors increase a cost for manufacturing an apparatus to perform the method.

SUMMARY OF THE INVENTION

The present invention has been made in view of the above situations, and an object thereof is to provide an invisible information recording medium having an invisible information recording layer above an underlying layer, the recording layer being invisible under visible light and fluorescing upon being applied with light having a particular wavelength excepting that of the visible light, thus becoming visible, and enabling easy, reliable information reading therefrom.

Other object of the present invention is to provide an information reading apparatus for efficiently reading information from the above described invisible information recording medium.

Further object of the present invention is to provide an information reading apparatus for reading information from an invisible information recording medium, which can obtain a sufficient light to be used from a fluorescent lamp while it is controlled by a method of repeatedly turning on and off the fluorescent lamp, and which can eliminate influence of a color of an underlying printed pattern to an invisible information recording medium by using only one sensor.

In order to achieve the first object of the present invention described above, an invisible information recording medium according to the present invention, comprising: an underlying layer; an invisible information recording layer which is provided above the underlying layer, is invisible under visible light, and fluoresces upon being applied with light having a particular wavelength excepting that of the visible light, thus becoming visible; and an optical modulation layer provided between the underlying layer and the invisible information recording layer.

In the invisible information recording medium according to this invention and having the arrangement described above, visible light generated by fluorescence of the invisible information recording layer is reflected by the underlying layer or an intermediate layer, e.g., an underlying printed layer which is sometimes interposed between the underlying layer and the invisible information recording layer. The reflected light is modulated by the optical modulation layer before it reaches the invisible information recording layer. When the underlying layer contains a fluorescent material, a part of light applied to the invisible information recording layer to excite the invisible information recording layer and to read information from the recording layer causes the fluorescent material to fluoresce, thereby generating visible light. This visible light is also modulated by the optical modulation layer before it reaches the invisible information recording layer. These modulating operations prevent the contrast of the invisible information recording layer, which has become visible by fluorescence, from being substantially decreased, so as to enable easy, reliable information reading from the invisible information recording layer which has become visible.

An information reading apparatus for reading information from the invisible information recording medium described above, comprises, when the optical modulation layer of the invisible information recording medium includes a photochromic layer, preliminary coloring means for coloring the photochromic layer of the optical modulation layer of the invisible information recording medium in advance, and information reading optical system for applying the light having the particular wavelength excepting that of the visible light to the invisible information recording layer of the invisible information recording medium to cause the invisible information recording layer to fluoresce after the photochromic layer of the optical modulation layer is colored in advance by the preliminary means, thereby making the invisible information recording medium visible, and reading information from the invisible information recording layer which has become visible.

An information reading apparatus for reading information from the invisible information recording medium described above comprises, when the optical modulation layer of the invisible information recording medium includes an optical polarizing film, information reading optical system for reading information from the invisible information recording layer which has become visible, and optical polarizing means, interposed between the invisible information recording layer which has become visible and the information reading optical system and having an optical polarizing angle substantially perpendicular to the optical polarizing angle of the optical polarizing film of the optical modulation layer of the invisible information recording medium, for guiding light from the invisible information recording layer which has become visible to the information reading optical system.

In order to achieve the third object of the present invention described above, an information reading apparatus for reading information from an invisible information recording medium, the invisible information recording medium comprising an underlying layer and an invisible information recording layer which is provided above the underlying layer, is invisible under visible light and fluoresces upon being applied with light having a particular wavelength excepting that of the visible light, thus becoming visible, the information reading apparatus comprising:

a fluorescent lamp as a light source for applying light on the invisible information recording medium;

light emission control means for controlling a light emission characteristic of the fluorescent lamp;

detecting means for detecting light from the invisible information recording medium applied with light from the fluorescent lamp;

binarizing means for binarizing an output of the detecting means; and binarizing control means for detecting light from a predetermined region by the detecting means, and for deciding a threshold level for binarizing in the binarizing means, with reference to a value detected from the predetermined region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view of a recording medium having a stealth bar code as an invisible information recording medium according to the first embodiment of the present invention;

FIG. 2 is a schematical view showing a preferable arrangement of a bar code recording apparatus for reading bar code information from the recording medium having a stealth bar code shown in FIG. 1;

FIGS. 3A and 3B are enlarged sectional views respectively showing two arrangements of stealth bar code layers which are not damaged by flex of the recording medium having a stealth bar code shown in FIG. 1;

FIG. 14 is a graph showing a characteristic of a thermistor used in further embodiment of the bar code reading apparatus for achieving the third embodiment of the present invention;

FIG. 15 is a schematic view showing a fluorescent lamp on which the thermistor of FIG. 14 is attached; and FIG. 16 is a block diagram showing a bar code reading apparatus using the fluorescent lamp of FIG. 15.

DETAILED DESCRIPTION OF THE PREFERRED EMBODIMENTS

Figure 4:
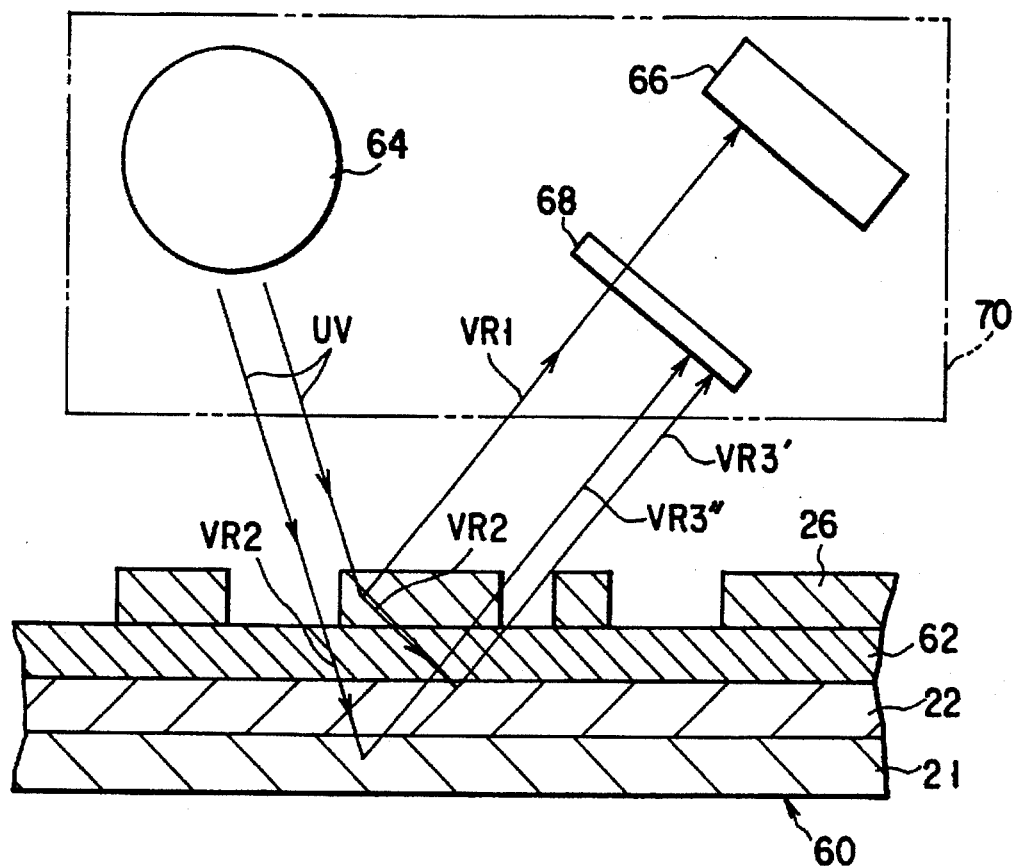
FIG. 4 is a sectional view showing a recording medium having a stealth bar code as an invisible information recording medium according to the second embodiment of the present invention, together with a preferable arrangement of a bar code reading apparatus for reading bar code information from this recording medium having a stealth bar code.
Figure 5:
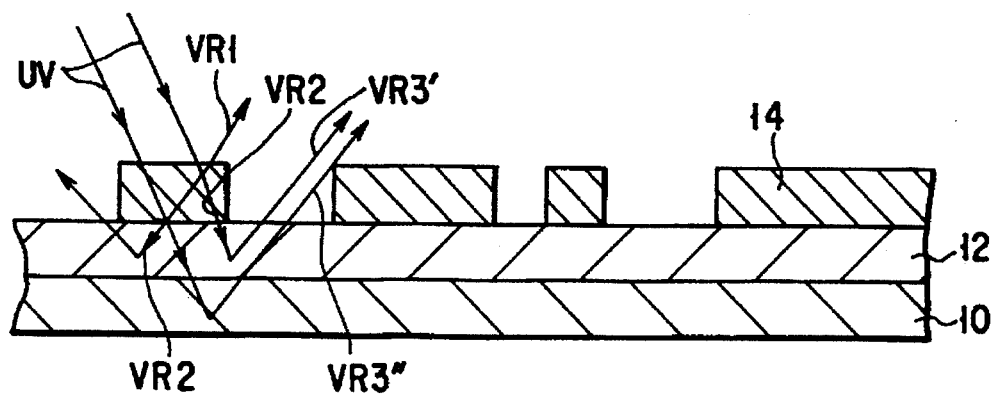
FIG. 5 is an enlarged sectional view of a conventional recording medium having a stealth bar code as a kind of invisible information recording medium.

Several embodiments of the present invention will be described in detail with reference to FIGS. 1 to 16 of the accompanying drawings.

FIG. 1 shows a section of a recording medium 20 having a stealth bar code as an invisible information recording medium according to a first embodiment of the present invention.

An underlying layer 21 of this embodiment is, e.g., a paper cover of a book. A fluorescent material is mixed in this paper cover to make the white color of the underlying layer 21 look clear. An underlying printed layer 22 is formed on a surface of the underlying layer 21 by printing a pattern, e.g., characters, figures, and pictures.

A photochromic layer 24 which functions as an optical modulation layer is formed on a surface of the underlying printed layer 22 by printing. A bar code constituted by an ink which is invisible under visible light and fluoresces upon being applied with light, e.g., ultraviolet rays, having a particular wavelength excepting that of the visible light, is printed as an invisible information recording layer on a surface of the photochromic layer 24, thus forming a bar code layer 26.

The photochromic layer 24 contains a photochromic material which is transparent under visible light but is blackened or turned to a colored state upon being applied with ultraviolet rays.

With this arrangement, under ordinary visible light, both the stealth bar code layer 26 and the photochromic layer 24 are transparent. Thus, the pattern, e.g., characters, figures, and pictures, of the underlying printed layer 22 can be seen from the outside through the stealth bar code layer 26 and the photochromic layer 24.

When bar code information need be read from the stealth bar code layer 26, a bar code reading apparatus (not shown) having an ultraviolet ray source as a lighting unit is used to apply ultraviolet rays Uv to the stealth bar code layer 26.

The ultraviolet rays UV cause the stealth bar code layer 26 to fluoresce and cause the photochromic layer 24 to blacken or turn it to a colored state.

visible light VR1, which is a part of the visible light generated by the fluorescence of the stealth bar code layer 26 and directs upward, makes the stealth bar code visible, and most of visible light VR2 which directs downward from the stealth bar code layer 26 is absorbed by the photochromic layer 24 which is mostly blackened or turned to the colored state and does not reach the underlying printed layer 22. Even if the visible light VR2 reaches the underlying printed layer 22 and is reflected by it, reflected light VR3' of the visible light VR2 is absorbed by the photochromic layer 24 and is not passed through the photochromic layer 24 to an outside thereof.

Even if the ultraviolet rays UV pass through the photochromic layer 24 and the underlying printed layer 22 and reach the underlying layer 21 to cause the fluorescent material in the underlying layer 21 to fluoresce, visible light VR3" generated by the fluorescence of the underlying layer 21 is absorbed by the photochromic layer 24 and is not emitted outside.

As described above, contrast among bars and spaces of the stealth bar code of the stealth bar code layer 26, the bar code fluorescing to become visible, is not decreased by influence of the visible light VR2 which is one of the visible light generated by the fluorescence of the stealth bar code layer 26 and directs downward below the stealth bar code layer 26, and by influence of the ultraviolet rays UV which pass through the photochromic layer 24 and the underlying printed layer 22 reach the underlying layer 21 and to cause the fluorescent material in the underlying layer 21 to fluoresce. Therefore, a bar code reading apparatus (not shown) can easily and reliably read bar code information from the stealth bar code of the stealth bar code layer 26 which fluoresces, thus becoming visible.

After the bar code information is read, when the bar code reading apparatus (not shown) is moved away from the stealth bar code layer 26 and the application of the ultraviolet rays to the stealth bar code layer 26 is stopped, the stealth bar code layer 26 stops fluorescing to become transparent. The photochromic layer 24 is then turned to a non-colored state as it is exposed to the visible light of the external space or as it absorbs heat of the external space, and is restored to the transparent state.

As a result, the pattern, e.g., characters, figures, and pictures, of the underlying printed layer 22 can be seen again from the outside through the stealth bar code layer 26 and the photochromic layer 24 which are transparent under ordinary visible light.

In general, the photochromic layer 24 is formed as a solid thin film on the underlying printed layer 22 by mixing photochromic material molecules in a binder material and printing the resultant material on the underlying printed layer 22, or directly on the underlying layer 21 when an underlying printed layer 22 is not present. However, a speed of reaction to the colored or non-colored state of the photochromic material molecules in a solid tends to be low as time passes in use when the speed of reaction to the colored state is decreased, bar code information reading from the stealth bar code takes time, which is inconvenient in practical use. When the speed of reaction to the non-colored state is decreased, it causes an inconvenience when the pattern, e.g., characters, figures, and pictures, of the underlying printed layer 22 located under the stealth bar code must be seen again from the outside immediately after bar code information reading is ended.

These inconveniences can be eliminated by designing the bar code reading apparatus to have the arrangement as shown in FIG. 2.

A bar code reading apparatus 30 in FIG. 2 has an ultraviolet rays emitting source 34, a bar code reading optical system 32, a preliminary light source 36 for turning a photochromic layer to the colored state and a light source 38 for turning the photochromic layer to the non-colored state respectively, these both light sources 36, 38 being arranged before and after the ultraviolet rays emitting source 34 and the bar code reading optical system 32.

In this bar code reading apparatus 30, to read bar code information from the stealth bar code layer 26, the recording medium 20 having the stealth bar code shown in FIG. 1 is passed under the preliminary light source 36, the ultraviolet rays application source 34, and the light source 38 in the order named as indicated by an arrow A.

In this case, the preliminary light source 36 applies a large number of ultraviolet rays having a relatively high intensity to the recording medium 20 having the stealth bar code to promote turning the photochromic layer 24 to the colored state, so that the photochromic layer 24 is turned to the colored state, before the bar code reading optical system 32 reads the bar code information from the stealth bar code layer 26 by means of ultraviolet rays application from the ultraviolet rays application source 34, to a degree not causing a problem in bar code information reading.

The light source 38 applies a large amount of visible light having a relatively high intensity to the recording medium 20 having the stealth bar code to promote turning the photochromic layer 24 to the noncolored state, after bar code information reading is ended, so that the photochromic layer 24 is turned to the non-colored state to a degree not causing a problem in seeing the pattern, e.g., the characters, figures, and pictures, of the underlying printed layer 22 again from the outside through the stealth bar code layer 26 and the photochromic layer 24 even immediately after the recording medium 20 is moved away from the bar code reading apparatus 30.

The photochromic layer 24 can be turned to the noncolored state also by heating it. Hence, a heat source can be used in place of the light source 38.

When the pattern, e.g., characters, figures, and pictures, of the underlying printed layer 22 located under the stealth bar code need not be seen again from the outside immediately after bar code information reading, the light source 38 and the heat source for turning the photochromic layer to the non-colored state can be omitted.

As a photochromic material which is turned to the colored state by ultraviolet rays application, e.g., borosilicate glass in which silver halide is dispersed in a colloidal state, an organic compound of spiropyrans, 1,3,3-trimethyl-6'-nitro (indoline-2,2'-benzopyran), and an organic compound of spirooxazines can be used.

Borosilicate glass in which silver halide is dispersed in the colloidal state is generally called as a photochromic glass and is put into practical use as the material of photochromic spectacles. 1,3,3-trimethyl-6'-nitro(indoline-2,2'- benzopyran) is turned to reddish purple upon ultraviolet rays application and makes the pattern, e.g., characters, figures, and pictures, of the underlying printed layer 22 almost invisible. Since a photochromic material containing an organic compound of spirooxazines has good repeatability and can be turned to the non-colored state quickly, it makes unnecessary the light source 38, or a heat source replacing the same, for turning the photochromic layer to the non-colored state, of the bar code reading apparatus 30 as shown in FIG. 2.

As a photochromic material other than those described above, e.g., stilbene, salicylideneaniline, acridineaniline, anthracene, a photochromic organic compound of thioindigos, and a photochromic organic compound of fulgides can be used.

The wavelength spectrum of the visible light generated by fluorescing of the fluorescent material contained in the stealth bar code layer 26 and the underlying layer 21 has a narrower range than that of white light. Accordingly, in order to absorb and shield, by the photochromic layer 24, the reflected light after the visible light generated by the fluorescence of the stealth bar code layer 26 is reflected by the underlying printed layer 22 and the underlying layer 21 and the visible light generated by the fluorescence of the underlying layer 21, it is enough that the photochromic layer 24 is turned to a color which absorbs only the wavelength of the visible light generated by the fluorescence of the fluorescent material contained in the stealth bar code layer 26 and the underlying layer 21. This color is not necessarily black.

When the wavelength of light generated by the fluorescence of the fluorescent material contained in the stealth bar code layer 26 and the underlying layer 21 and the wavelength of light absorbed by the color of the photochromic layer 24 are considered, the kinds of photochromic materials which can be employed can be widened.

Borosilicate glass in which silver halide is dispersed in the colloidal state is a photochromic material which is usually called as a photochromic glass. This photochromic glass is blackened upon ultraviolet rays application to absorb the entire wavelength range of visible light. Thus, the kinds of fluorescent materials to be contained in the stealth bar code layer 26 can be widened.

However, when this photochromic glass is applied to the photochromic layer 24 of the present invention to obtain a desired effect upon turning it to the colored state, the thickness of the photochromic layer 24 becomes rather large. As a result, if the underlying layer 21 is constituted by a comparatively soft material, e.g., paper, when the recording medium 20 having a stealth bar code flexes, the photochromic layer 24 is damaged, and the desired effect cannot be obtained.

In order to obtain the desired effect by applying the photochromic glass described above to the photochromic layer 24 of the present invention and turning the photochromic layer 24 to the colored state, while not damaging the photochromic layer 24 even when the recording medium 20 flexes, as shown in FIG. 3A, photochromic glass particles 40 may be mixed in a flexible plastic binder 42 having substantially the same refractive index as that of the photochromic glass particles 40, and the resultant mixture may be coated on the underlying printed layer 22, or directly on the underlying layer 21 when no underlying printed layer 22 exists, thereby forming the photochromic layer 24.

As the binder, a material that can sufficiently transmit ultraviolet rays therethrough must be used.

Since the photochromic glass particles 40 and the binder 42 have substantially the same refractive index, under ordinary visible light, the photochromic glass particles 40 cannot be seen. Thus, the pattern, e.g., characters, figures, and pictures, of the underlying printed layer 22 can be clearly seen through the photochromic layer 24 without distortion.

As shown in FIG. 3B, if the photochromic layer 24 is formed by bonding photochromic glass fibers 50 with a flexible plastic binder 42 having substantially the same refractive index as that of the photochromic glass particles 40 and disposing the resultant mixture on the underlying printed layer 22, or directly on the underlying layer 21 when no underlying printed layer 22 exists, the same effect as that of the photochromic layer 24 shown in FIG. 3A can be obtained.

FIG. 4 shows a section of a recording medium 60 having a stealth bar code as an invisible information recording medium according to a second embodiment of the present invention.

The recording medium 60 having the stealth bar code of this embodiment uses a polarizing film 62 as an optical modulation layer in place of the photochromic layer 24 of the recording medium 20 having the stealth bar code shown in FIG. 1. As the structure of the recording medium 60 is the same as that of the recording medium 20 except for the polarizing film 62, the same members as in the recording medium 20 are denoted by the same reference numerals, and a detailed description thereof will be omitted.

To read bar code information from the recording medium 60 according to the second embodiment, a bar code reading apparatus 70 is prepared, which has an ultraviolet rays application source 64 as a light emitting unit and in which a polarizing plate (analyzer) 68, having a polarizing plane perpendicular to a polarizing plane of the polarizing film 62 of the recording medium 60, is arranged on a light-incident side of a bar code reading optical system In this embodiment, when ultraviolet rays Uv are applied from the ultraviolet rays application source 64 of the bar code reading apparatus 70 onto a stealth bar code layer 26 to read the bar code information from the stealth bar code layer 26, the stealth bar code layer 26 fluoresces.

As a visible light caused by this fluorescence has no polarization, only a part of visible light VR1 directed to the bar code reading optical system 66 of the bar code reading apparatus 70 above the stealth bar code layer 26, the part of the visible light VR1 being a light component in the polarizing direction of the polarizing plate (analyzer) 68, is transmitted through the polarizing plate (analyzer) 68, and is incident on the bar code reading optical system 66.

Visible light VR2 directed downward below the stealth bar code layer 26 applies on the underlying printed layer 22 through the polarizing film 62. Light VR3' reflected by the underlying printed layer 22 is directed again to the bar code reading optical system 66 of the bar code reading apparatus 70 through the polarizing film 62.

The reflected light VR3' has only a light component in the polarizing direction of the polarizing film 62 as it is polarized by the polarizing film 62. Since this polarizing direction is perpendicular to the polarizing direction of the polarizing plate (analyzer) 68 arranged on the light-incident side of the bar code reading optical system 66, the reflected light VR3' is shielded by the polarizing plate (analyzer) 68 and cannot reach the bar code reading optical system 66.

The fluorescent material in the underlying layer 21 sometimes fluoresces upon application of ultraviolet rays UV reaching the underlying layer 21. However, since visible light VR3" caused by this fluorescence is also converted to polarized light in a direction perpendicular to the polarizing direction of the polarizing plate (analyzer) 68 as it passes through the polarizing film 62, even if it reaches the polarizing plate (analyzer) 68, it is shielded by the polarizing plate (analyzer) 68, and cannot reach the bar code reading optical system 66.

In fine, only the visible light VR1 directed to the bar code reading optical system 66 of the bar code reading apparatus 70 above the stealth bar code layer 26 can reach the bar code reading optical system 66. As a result, even if the contrast of the stealth bar code layer 26 is degraded by the light reflected by the underlying printed layer 22 or underlying layer 21, the visible light generated by fluorescence of the underlying layer 21, or by the underlying printed pattern which can be seen under the reflected light, the bar code information can be easily and reliably read even from the stealth bar code layer 26.

In the two embodiments described above, the invisible information recording layer is the stealth bar code layer 26. However, the invisible information recording layer is not limited to a layer having a bar code but can be a layer having other information recording means.

In this specification, a term "optical modulation" also includes a function of preventing incidence of ultraviolet rays on the underlying printed layer and the underlying layer, as in the first embodiment of this specification.

In the following, a principle of a bar code reading apparatus for achieving the third object of the present invention will be explained with reference to FIGS. 6 to 8.

Figure 6:
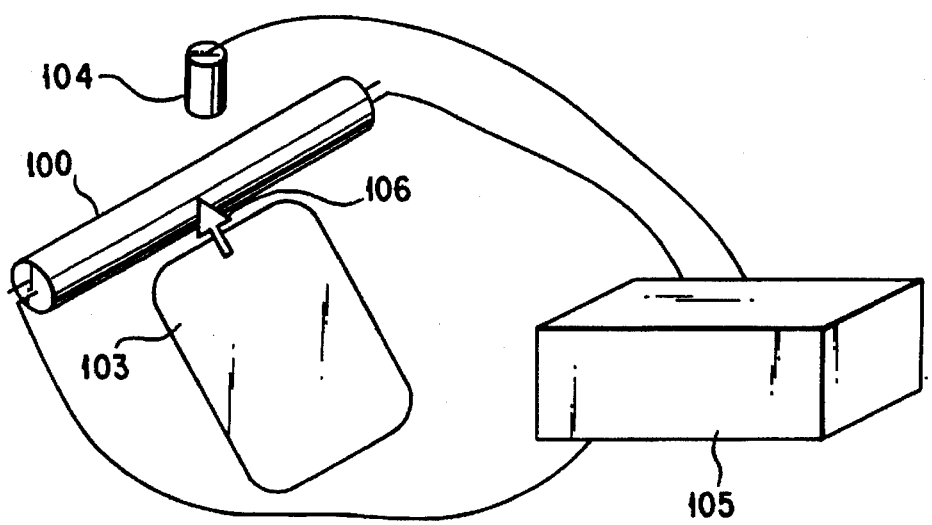
FIGS. 6 and 7 are views of a principal structure and a block diagram of a bar code reading apparatus for achieving a third object of the present invention.
Figure 7:
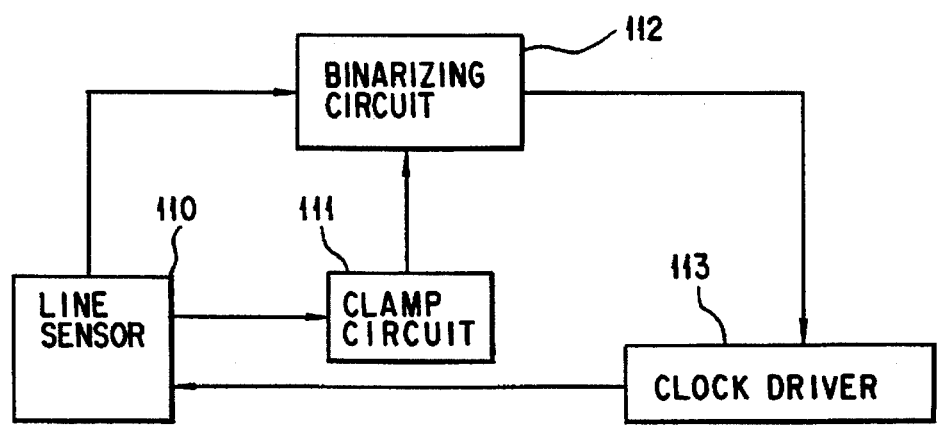
Figure 8:
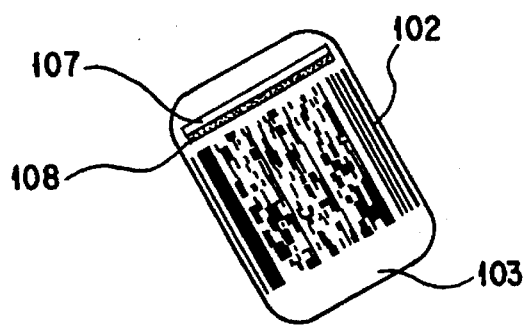
FIG. 8 shows a card on which a bar code to be read is printed.

As shown in FIG. 6, the bar code reading apparatus according to the present invention is arranged such that it applies ultraviolet rays from a fluorescent lamp 100, thereby making fluorescent ink forming an invisible bar code 102 (which is printed as shown in FIG. 8) fluoresce, and the bar code is read by a line sensor 110 shown in FIG. 7.

In this structure, the fluorescent lamp 100 applies light when a card 103 on which the invisible bar code 102 is printed is inserted and is detected. In this state, the fluorescent lamp 100 has an transient light emission characteristic, so that a quantity of light must be controlled. Therefore, a sensor 104 is arranged so as to detect the quantity of light from the fluorescent lamp 100, and an output from the sensor 104 is inputted to an inverter circuit 105, as shown in FIG. 6. In the inverter circuit 105, the quantity of light of the fluorescent lamp 101 is adjusted by controlling a control pulse width in correspondence with the output of this sensor 104, and the quantity of light from the fluorescent lamp 101 is maintained to be constant.

As shown in FIG. 8, a white reference 107 and a black reference 108 are also formed of fluorescent ink in front of the bar code in such a manner that the references extend at right angles to a card insertion direction 106.

Further, the white and black references 107 and 108 are read by a line sensor 100 shown in FIG. 7, and read values of the respective references are clamped by a clamp circuit 111. As the card is inserted deeply, the bar code 102 or a portion where data is printed moves to a reading position of the line sensor 110, and the data reading is started. In this state, in a binarizing circuit 112, binarizing process is performed, with read values of the white and black references 107 and 108 being used as references.

A clock driver 113 generates various pulses in accordance with a control signal from the binarizing circuit 112, and drives the line sensor 110.

In the above structure, it is possible to exactly read the bar code formed of invisible ink.

In this case, in addition to a conventional one-dimensional bar code, a two-dimensional bar code such as PDF-417 can be read as a bar code (as to PDF-417 is specifically explained in Japanese Patent Application KOKAI Publication No. 3-62004).

Various embodiments of the present invention will be explained below, with reference to FIGS. 9 to 16.

Figure 9:
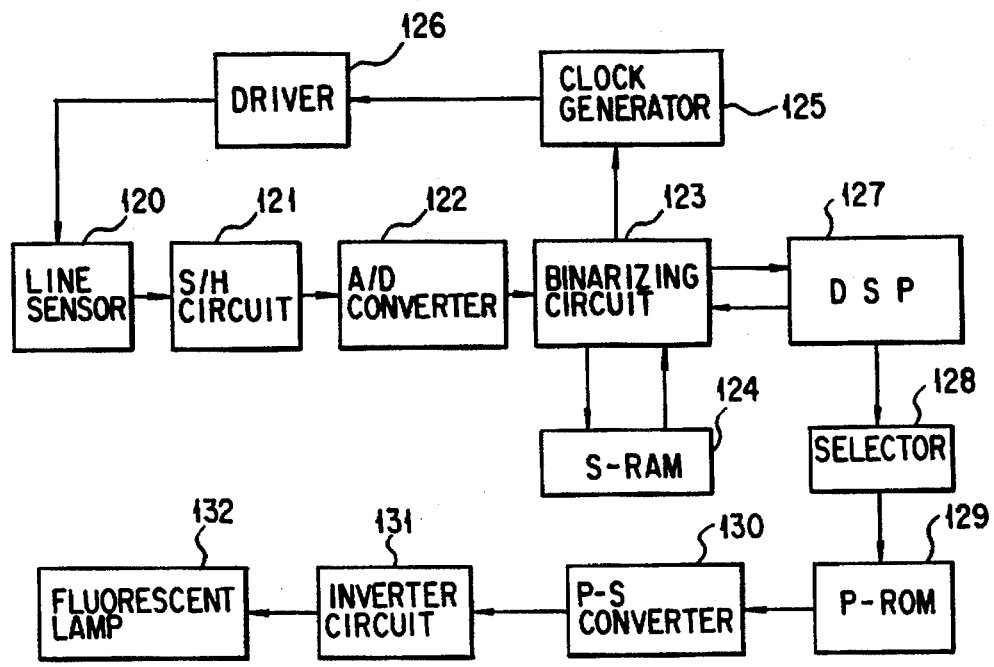
FIG. 9 shows a block diagram of an embodiment of the bar code reading apparatus for achieving the third object of the present invention.

FIG. 9 is a block diagram showing a structure of an embodiment of a bar code reading apparatus which achieves the third object of the present invention.

First, when insertion of a card on which a stealth bar code is printed is detected by a sensor not shown, a digital signal processor (DSP) 127 sends a control signal to a selector 128, thereby selecting data to be read. Data to be selected is previously recorded in a P (Programmable)-ROM 129. This data is used for forming pulse columns in the inverter circuit 31 such that a fluorescent lamp 132 stably emits light. Since data columns recorded on the P-ROM 129 are outputted in parallel to each other, data columns are converted into serial data by a parallel-serial (P-S) inverter 130, and are then supplied to an inverter circuit 131. The inverter circuit 131 changes the quantity of light from the fluorescent lamp 132 in accordance with the inputted serial data (light emission control signals).

Meanwhile, the DSP 127 further sends a control signal to a binarizing circuit 123 in response to the insertion detection signal of the above card. The binarizing circuit 123 sends a control signal to a clock generator 125 so that the generator 125 generates a sensor driving pulse. Various pulses are thus sent from the clock generator 125 through a driver 126, and a line sensor 120 starts reading of images.

When the card is inserted and the white reference 107 as shown in FIG. 8 reaches the line sensor 120 at first, outputs of the line sensor 120 pass through a sample and hold circuit 121, the outputs as analogue data are converted into digital data by an analogue/digital (A/D) circuit 122, and the digitalized data is transferred to the binarizing circuit 123. This value is transferred to an S (Static)-RAM 124 from the binarizing circuit 123 and is recorded in the S-RAM 124.

When the card is inserted more deeply, data of the black reference 108 as shown in FIG. 8 is read by the line sensor 120, and is recorded into the S-RAM 124 through the same process as in the case of the white reference 107.

Then, when the card is inserted much more deeply, data of the bar code 102 is read by the line sensor 120. In this state, values of the white and black references 107 and 108 which has been read are taken into the binarizing circuit. The bar code data converted into digital data are compared with the read values of the white and black references 107 and 108, and are thereby binarized.

Binarized data is sent to the DSP 127 and is subjected to be processed for a predetermined decoding.

Next, operation of the present embodiment will be explained with reference to FIGS. 10 and 11.

Figure 10:
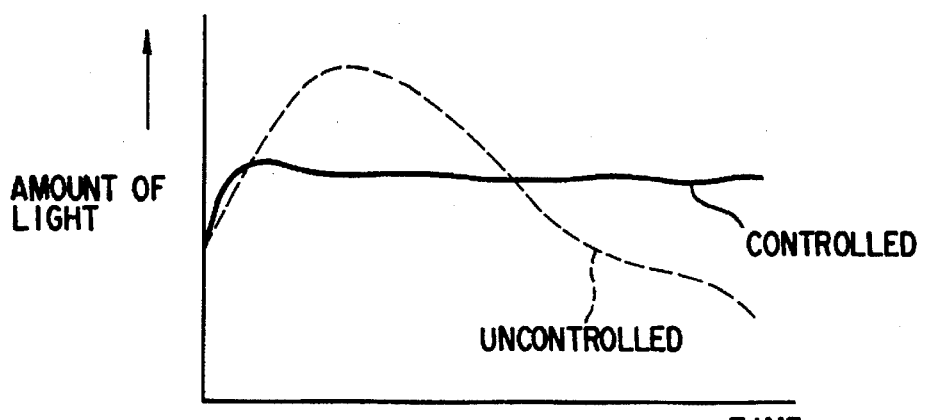
FIG. 10 is a graph showing a light emission characteristic of a fluorescent lamp shown in FIG. 9.
Figure 10:

FIG. 10 is a graph showing a light emission characteristic of the fluorescent lamp of FIG. 9. A dashed line shown in the graph indicates the light emission characteristic wherein no control signal is supplied to the inverter circuit 131. The quantity of light rapidly increases at the time when a power source is turned on, and gently decreases after the quantity reaches its peak. A solid line indicates a characteristic where serial data, i.e., a light emission control signal is supplied from the P-S converter 130, in order to maintain the light emission characteristic to be stable. In this case, serial data is inputted such that a pulse cycle is fast when the quantity of light is small while the pulse cycle is slow when the quantity of light is large, in order to constantly maintain the quantity of light.

Figure 11:
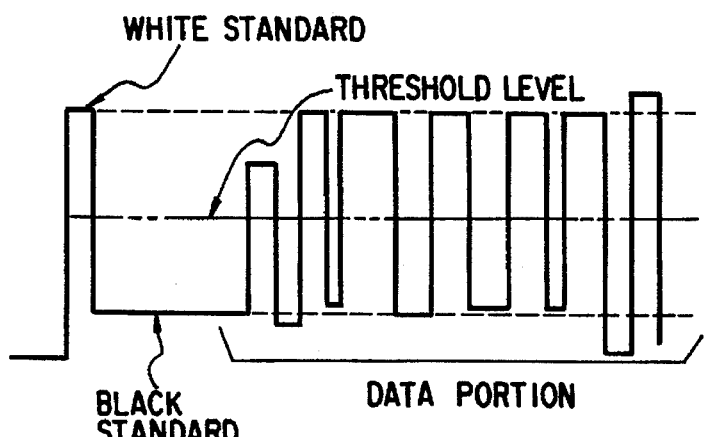
FIG. 11 shows a waveform read by using a line sensor of FIG. 9.

FIG. 11 shows a waveform read by the line sensor 120 of FIG. 9. At first, the white reference is read, and then, the black reference is read. Thereafter, a data portion of the bar code is read after a small time have passed, and the binarizing circuit 123 decides its threshold value with reference to the read values of the white and black references.

In this embodiment, since the light emission characteristic of the fluorescent lamp 132 can thus be maintained to be constant, the quantity of light excited by the fluorescent ink can be maintained to be constant. Further, since the white and black references are decided at first and the threshold value is then decided, a bar code can be stably read even if a back ground condition differs.

The following explanation will be made to a structure of another embodiment of the bar code reading apparatus which achieves the third object of the present invention.

Figure 12:
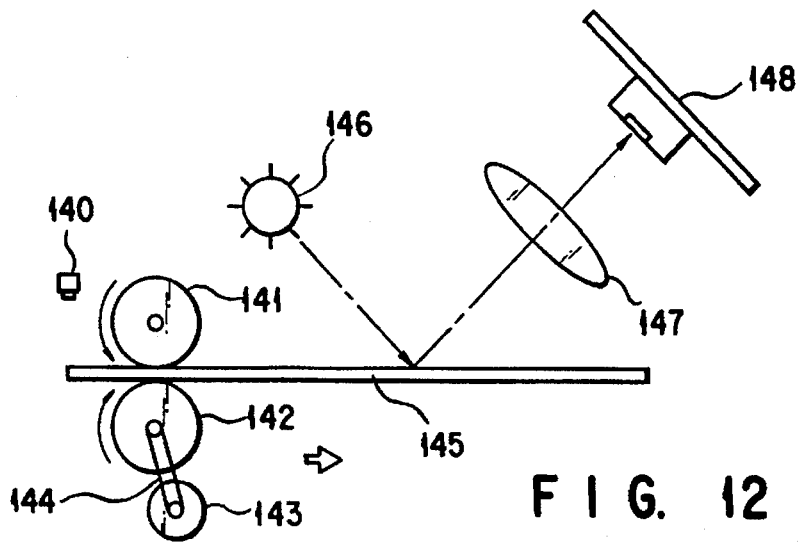
FIG. 12 is a schematic view showing a mechanism of another embodiment of the bar code reading apparatus for achieving the third object.

FIG. 12 schematically shows a mechanical structure of this embodiment.

At first, a card 145 is inserted and then an insertion of the card 145 is detected by an insertion detecting sensor 140, and rollers 141 and 142 are rotated in arrowed directions respectively shown in the figure. At the same time, a belt 144 provided on a rotation axis of the roller 142 starts rotating. On both sides of opposing short edges of the belt 144 two components of a frequency generator 143 are arranged and a rotation of the roller 142 is transferred to the frequency generator 143 through the belt 144.

A fluorescent lamp 146 is arranged above the card 145, and light from the lamp 146 is applied on a stealth bar code formed on the card 145.

Further, a lens 147 and a line sensor 148 are arranged on a line orthogonal to a center position of a line on the card 145 on the line of which the light axis of the fluorescent lamp 146 crossing the card 145. Reflected light from the card 145 is concentrated by the lens 147, and led to a light receiving portion of the line sensor 148.

Figure 13:
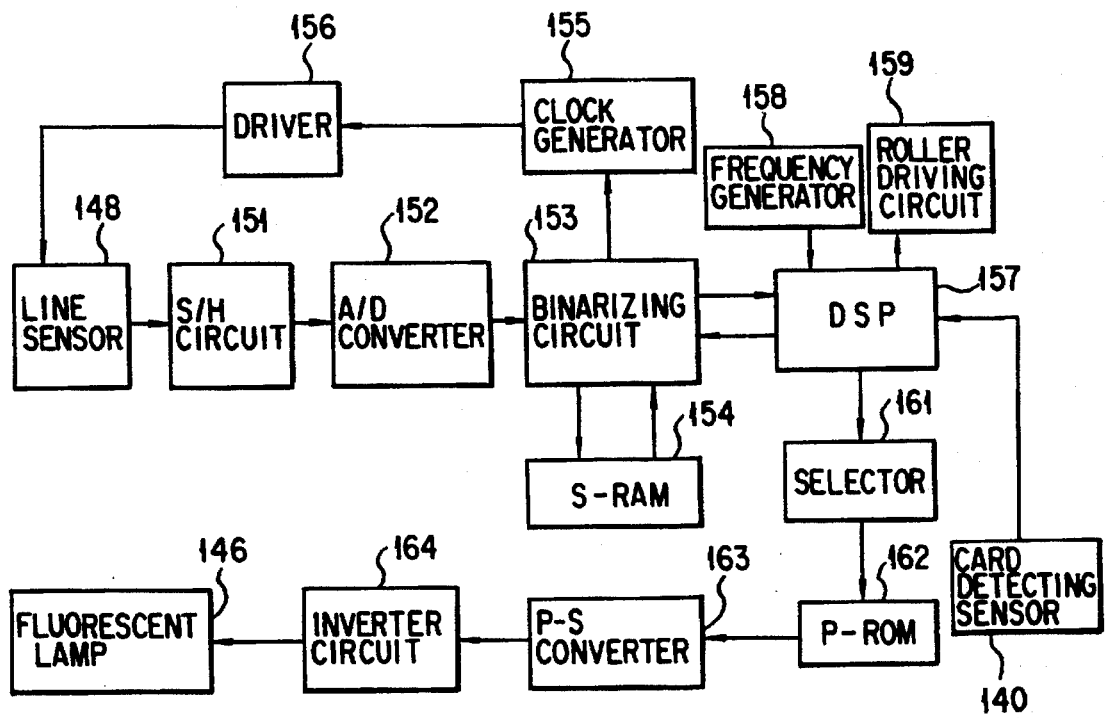
FIG. 13 is a block diagram of another embodiment of FIG. 12.

A structure of the embodiment shown in FIG. 13 will be explained on the basis of FIG.

At first, when insertion of the card 145 is detected by the insertion detecting sensor 140, a DSP 157 sends a control signal to a roller driving circuit 159 such that the circuit 159 drive the rollers 141 and 142. When the rollers 141 and 142 start rotating by the circuit 159, the frequency generator 143 generates a pulse synchronized with rotation of the roller 142. This pulse is sent to the DSP 157 and the DSP 157 calculates a transferred position of the card 145.

Meanwhile, the DSP 157 sends a control signal to a selector 161 and selects data to be read. The data to be selected is previously recorded in a (Programmable)-ROM 162. This data forms pulse columns in an inverter circuit 154 such that the fluorescent lamp 146 stably emits light. Since the data columns recorded in the P-ROM 162 are outputted in parallel to each other they are converted into serial data by a P-S (Parallel-Serial) converter 163, and then is supplied to the inverter circuit 154. The inverter circuit 154 changes a quantity of light of the fluorescent lamp 146 in accordance with the inputted serial data.

Further, the DSP 157 supplies a control signal to a binarizing circuit 153 in response to the card insertion detecting signal, and a control signal is supplied from the binarizing circuit 153 to a clock generator 155 such that this generator generates a sensor drive pulse. Various pulses are thereby sent from the clock generator 155 through a driver 156, and the line sensor 148 starts reading an image.

When the card 145 is further transferred by further rotation of the rollers 141, 142 and the DSP 157 calculates that the card 145 reaches a predetermined position, the DSP 157 sends a control signal to the roller driving circuit 159 to stop the rotation of the rollers 141 and 142. In the situation where the movement of the 145 stops, the DSP 157 sends a data switching signal to the selector 161, and the data of the P-ROM 162 is switched thereby changing the quantity of light from the fluorescent lamp 146 on occasion.

The amount of the change in quantity of light is photoelectrically converted and is supplied as digital data to the binarizing circuit 153 through an S/H circuit 151 and an A/D converter 152. The binarizing circuit 153 determines a positional relationship between the digital data and its internal threshold value, and the determination data is transferred to the DSP 157. When the DSP 157 detects the transferred determination data, the DSP 157 sends the data switching signal to the selector 161, thereby the selector 161 to select the data to be read by the P-ROM 162.

The above operation is repeated for a plurality of times until binarized data is stably supplied to the DSP 157. The binarized data is sent to the DSP 157 on occasion, and data processing is carried out.

When the processing for one line is finished, the DSP 157 supplies again the roller driving circuit 159 with a command so that the rollers 141 and 142 start rotating.

The above operation is repeated until all data of the stealth bar code is read.

Specifically, in this embodiment, the bar code is read for every one line while the card 145 is transferred by rollers 141 and 142. The quantity of light is controlled so that influences from the underlying layer are as little as possible and so that the sharpest contrast can be obtained.

Therefore, if the underlying layer is not colored by one single color, influences from the underlying layer differs depending on each colored areas of the underlying layer, and therefore, changes in offset range and sharpness of contrast occur in accordance with outputs of the line sensor 148. However, in the structure of this embodiment, factors causing such changes are removed and stable binarized data can be obtained.

Next, further another embodiment of the bar code reading apparatus which achieves the third object of the present invention will be explained.

In this embodiment, a thermistor is used to adjust quantity of light from a fluorescent lamp, since increases in temperature is a main factor which causes a change in quantity of light from a fluorescent lamp. Specifically, the thermistor has an element resistance value which increases with a certain characteristic curve as the temperature increases, as shown in FIG. 14.

Using this characteristic of the thermistor, control is performed by the structure as shown in FIG. 16. A line sensor 170, a S/H circuit 171, an A/D converter 172, a binarizing circuit 173, a S-RAM 174, a clock generator 175, a driver 176, and a DSP 177 shown in this figure are the same as those used in the embodiment of FIG. 9, and explanation thereof will be omitted herefrom.

A fluorescent lamp 178 is controlled by an inverter circuit 179. An add result obtained by an adder 181 is inputted into the inverter circuit 179 through a P-S converter 180. The adder 181 adds an output of a P-ROM 182 to an output of a differential amplifier (AMP) 184 supplied through an A/D converter 183. The differential amplifier 184 is used to obtain a difference in voltages between both ends of a bridge circuit, and the bridge circuit 185 includes a thermistor 187 installed on a fluorescent lamp (or fluorescent tube) by a fixing bracket 186, as shown in FIG. 15.

In this structure, when the fluorescent lamp 178 emits light, the installed thermistor 187 is warmed, thereby raising its resistance value. A difference in voltage therefore appears between both ends of the bridge circuit 185. This difference is extracted by the differential amplifier 184 and is then added to the A/D converter 183. The number of bits of the output of this A/D converter 183 gradually increases from LSB to MSB, and the bits are inputted into one end of the adder 181.

The adder 181 has another input end into which an output of the P-ROM 182 is inputted. Since the quantity of light from the fluorescent lamp 178 decreases in correspondence with a light emission time period of the fluorescent lamp, data for correcting such decreases is stored in the P-ROM 182.

Two items of data thus inputted into the adder 181 are added to each other. The add result is inputted into the P-S converter 180 and is outputted from the convertor 180 as serial data. The quantity of light from the fluorescent lamp 178 can be changed by inputting the serial data into the inverter circuit 179.

Due to this series of operation, the fluorescent lamp 178 can thus stably emit a quantity of light even when the temperature changes.

As has been explained above, according to the bar code reading apparatuses shown in FIGS. 9, 12, and 16, emission of light of the fluorescent lamp can be stabilized by changing the pulse width of the inverter circuit even when a fluorescent lamp is repeatedly turned on and off to emit light, and light reflected from the bar code and other light reflected from the color of the underlying layer are previously sampled and held to eliminate influences of the colors of the underlying layer. It is therefore possible to obtain emission of light being sufficient for practical use even with a method of repeatedly turning on and off a fluorescent lamp, and to eliminate influences of the color of the underlying layer from the invisible bar code with use of only one single sensor. As a result, an invisible bar code can be accurately read.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information reading apparatus for reading information from an invisible information recording medium including: an underlying layer; an invisible information recording layer which is provided above said underlying layer, is invisible under visible light, and fluoresces upon being applied with light having a particular wavelength excepting that of the visible light, thus becoming visible; and an optical modulation layer provided between said underlying layer and said invisible information recording layer and including a photochromic layer, said information reading apparatus comprising:
preliminary coloring means for coloring said photochromic layer of said optical modulation layer of said invisible information recording medium in advance; and
an information reading optical system for applying the light having the particular wavelength excepting that of the visible light to said invisible information recording layer of said invisible information recording medium to cause said invisible information recording layer to fluoresce immediately after said photochromic layer of said optical modulation layer is colored in advance by said preliminary coloring means, thereby making said invisible information recording medium visible, and reading information from said invisible information recording layer which has become visible.

2. An apparatus according to claim 1, further comprising means for turning said photochromic layer of said optical modulation layer of said invisible information recording medium to a non-colored state after information is read from said invisible information recording medium which has become visible, by said information reading optical system.

3. An apparatus according to claim 2, wherein said means for turning said photochromic layer to the non-colored state comprises visible light emitting means for emitting visible light to said photochromic layer.

4. An apparatus according to claim 2, wherein said means for turning said photochromic layer to the non-colored state comprises heating means for heating said photochromic layer.

5. An information reading apparatus for reading information from an invisible information recording medium including: an underlying layer, an invisible information recording layer which is provided above said underlying layer, is invisible under visible light, and fluoresces upon being applied with light having a particular wavelength excepting that of the visible light, thus becoming visible; and an optical modulation layer provided between said underlying layer and said invisible information recording layer and including an optical polarizing layer, said information reading apparatus comprising:
an information reading optical system for reading information from said invisible information recording layer which has become visible; and
optical polarizing means, interposed between said invisible information recording layer which has become visible and said information reading optical system and having an optical polarizing angle substantially perpendicular to the optical polarizing angle of said optical polarizing film of said optical modulation layer of said invisible information recording medium, for guiding light from said invisible information recording layer which has become visible to said information reading optical system.

* * * * *